(12) United States Patent
Ahn et al.

(10) Patent No.: US 11,865,919 B2
(45) Date of Patent: Jan. 9, 2024

(54) VEHICLE DISPLAY DEVICE

(71) Applicant: HYUNDAI MOBIS CO., LTD., Seoul (KR)

(72) Inventors: Sung Joon Ahn, Seongnam-si (KR); Seung Hwan Lee, Hwaseong-si (KR); Tae Hun Kim, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 176 days.

(21) Appl. No.: 17/510,590

(22) Filed: Oct. 26, 2021

(65) Prior Publication Data
US 2022/0126693 A1  Apr. 28, 2022

(30) Foreign Application Priority Data
Oct. 26, 2020  (KR) .......................... 10-2020-0139494

(51) Int. Cl.
*B60K 37/02* (2006.01)
*B60K 37/06* (2006.01)

(52) U.S. Cl.
CPC .............. *B60K 37/02* (2013.01); *B60K 37/06* (2013.01); *B60K 2370/47* (2019.05); *B60K 2370/744* (2019.05)

(58) Field of Classification Search
CPC .... B60K 37/02; B60K 37/06; B60K 2370/47; B60K 2370/744; B60K 2370/122; B60K 2370/126; B60K 2370/128; B60K 2370/1523; B60K 35/00; B60K 2370/152; B60K 2370/1868; B60R 16/023; B60Y 2400/301
See application file for complete search history.

(56) References Cited

U.S. PATENT DOCUMENTS

| 2007/0125914 A1* | 6/2007 | Liou ...................... | F16M 11/24 |
| | | | 248/122.1 |
| 2017/0153718 A1* | 6/2017 | Brown .................... | B60K 37/06 |
| 2018/0107320 A1* | 4/2018 | Im ............................ | B60Q 9/00 |
| 2018/0154774 A1* | 6/2018 | Park ........................ | G06F 3/017 |

* cited by examiner

*Primary Examiner* — Ryan W Sherwin
(74) *Attorney, Agent, or Firm* — NovoTechIP International PLLC

(57) ABSTRACT

A vehicular display device according to one embodiment of the present disclosure includes a display configured to display, as an image, a function for various pieces of vehicle operation information, a knob operatively coupled to the display and configured to selectively operate a corresponding function of the display according to left-right movement, and guide rails configured to provide a movement path for the knob and divide a plurality of functional areas interlocked with functions displayed on the display.

11 Claims, 15 Drawing Sheets

C-C'

D-D'

VEHICLE DISPLAY DEVICE

CROSS-REFERENCE TO RELATED APPLICATIONS

This application claims priority to and the benefit of Korean Patent Application No. 10-2020-0139494, filed on Oct. 26, 2020, the disclosure of which is incorporated herein by reference in its entirety.

BACKGROUND OF THE INVENTION

1. Field of the Invention

The present disclosure relates to a vehicular display device.

2. Discussion of Related Art

According to the related art, technologies for providing content according to the selection of an occupant or a driving situation by providing a vehicular display device have been proposed. However, in the related art, since a form in which the vehicular display devices are fixedly disposed in front of a driver seat and a passenger seat is merely proposed, there is a limitation in providing a service.

BRIEF SUMMARY OF THE INVENTION

The present disclosure is directed to providing a vehicular display device in which a sliding knob and a display is integrated, thereby securing the degree of freedom of a slimmed cockpit space and realizing intuitive operation convenience.

The aspects of the present disclosure are not limited to the aspects described above, and those skilled in the art will clearly understand other aspects not described herein from the following description.

One aspect of the present disclosure provides a vehicular display device including a display configured to display, as an image, a function for various pieces of vehicle operation information, a knob electrically interlocked with the display and configured to selectively operate a corresponding function of the display according to left-right movement, and guide rails configured to provide a movement path for the knob and divide a plurality of functional areas interlocked with functions displayed on the display.

The display may switch and display a function-specific image for the vehicle operation information whenever the knob is located in the functional area.

The guide rails may be arranged at regular intervals in a lengthwise direction and may be provided with a plurality of location sensors arranged in the functional areas, and the location sensor may detect a location of the knob and transfer the detected location to an electronic control unit (ECU).

The guide rails may be provided with locking grooves recessed in the functional areas located at regular intervals in a lengthwise direction.

The locking grooves may divide location areas of the knob which are interlocked with functions of the display.

The knob may be provided with a ball plunger using a ball spring manner, which is fitted in the locking groove, when the knob moves in the lengthwise direction of the guide rail.

A wire may be provided between the knob and the display to electrically connect the knob and the display.

The wire may be bent around the guide rail to prevent mutual interference when the knob moves on the guide rail.

The knob may be provided with a fixing bracket through which the wire is attached or detected.

The knob may be wirelessly connected to the display in an ultra-wide band (UWB) manner.

Another aspect of the present disclosure provides a vehicular display device including a display configured to display a function-specific image for vehicle operation information, a knob electrically interlocked with the display and configured to selectively operate a corresponding function of the display according to left-right movement, and a drive control unit configured to control the display to display the corresponding function according to location movement of the knob.

The drive control unit may include a guide rail configured to provide a left-right movement path for the knob, a plurality of location sensors arranged in the guide rail at regular intervals and configured to detect a location of the knob, and a controller configured to compare a preset data value with a value of the location of the knob detected by the location sensor, and control, according to a result value of the comparison, the display to display the corresponding function.

Still another aspect of the present disclosure provides a vehicular display device including a display configured to display a function-specific image for vehicle operation information, and a knob electrically interlocked with the display and configured to selectively operate a corresponding function of the display according to left-right movement, wherein the display displays a function-specific menu interlocked with the knob when a conductor approaches the knob within a preset proximity distance.

A guide rail may be provided between the display and the knob to provide a movement path for the knob.

The knob may be provided with a connecting bracket connected to the guide rail.

The knob may be provided with a liquid crystal display (LCD) configured to display, as an image, a widget interlocked with the function-specific image of the display.

A Time of Flight (ToF) sensor having a view angle in an image display direction of the LCD may be provided at a lower end of the knob.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF THE INVENTION

Advantages and features of the present disclosure and a method of achieving the advantages and the features will become apparent with reference to embodiments described below in detail together with the accompanying drawings. However, the present disclosure is not limited to the embodiments described below but will be implemented in various forms, and the present embodiments merely make the disclosure of the present disclosure complete, are provided to completely inform the scope of the present disclosure to those skilled in the art, to which the present disclosure belongs, and are defined by the description of the appended claims. Meanwhile, terms used in the present specification are intended to describe the embodiments and are not intended to limit the present disclosure. In the present specification, a singular form also includes a plural form unless specifically mentioned in a phrase. The term "comprise" or "comprising" used herein does not exclude the presence or addition of one or more other components, steps, operations, and/or elements in addition to components, steps, operations, and/or elements mentioned above.

Hereinafter, exemplary embodiments of the present disclosure will be described in detail with reference to the accompanying drawings.

First Embodiment

Figure 1:
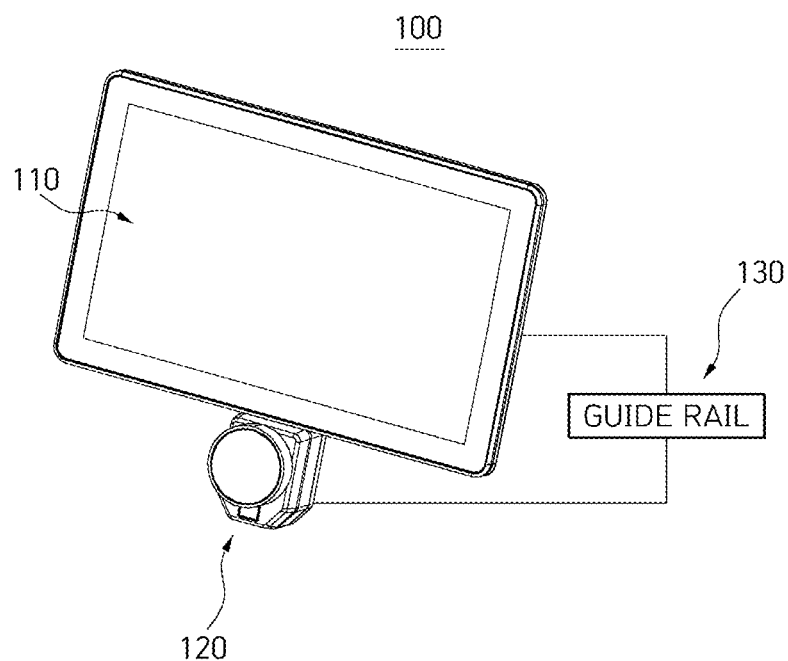
FIGS. 1 and 2 are schematic front and side views illustrating a vehicular display device according to a first embodiment of the present disclosure.
Figure 2:
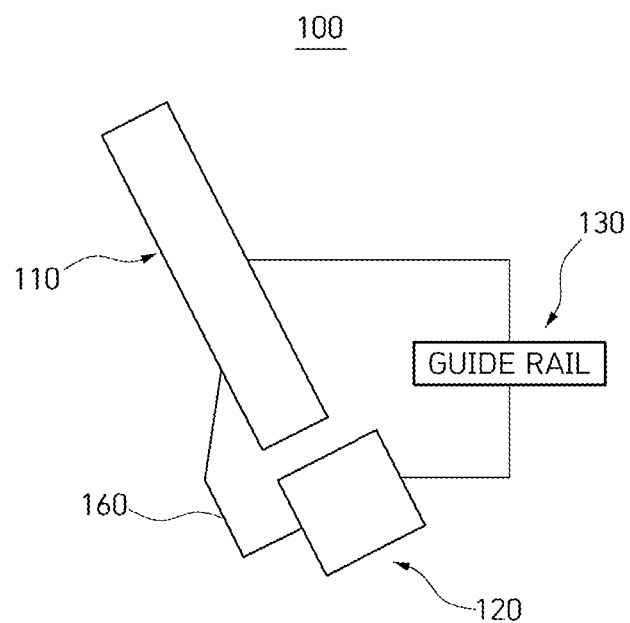

FIGS. 1 and 2 are schematic front and side views illustrating a vehicular display device according to a first embodiment of the present disclosure.

A vehicular display device 100 illustrated in FIGS. 1 and 2 is located between a driver seat and a passenger seat in a cockpit. The vehicular display device includes a display 110, a knob 120, and a guide rail 130.

A basic concept of the vehicular display device 100 is a structure in which the knob 120 and the display 110 are operatively coupled or interlocked with each other, and the display 110 switches and displays function-specific images for various pieces of vehicle operation information according to left-right movement of the knob 120.

In this case, as the display 110 is located on a center fascia as a large screen, it is difficult to provide a space in which surrounding electronic units are arranged. Thus, instead of a physical button having a function for the vehicle operation information, the display 110 displays the corresponding function as a widget image. To this end, the display 110 may improve intuitiveness and operability by reducing a depth and an operation step of a menu for the corresponding function displayed as a widget. For example, the display 110 may display a plurality of widget images associated with a plurality of vehicle operation functions, respectively.

The knob 120 may selectively operate various functions of the display 110 according to the left-right movement. The knob 120 has a structural mechanism that may slide at a lower end of the display 110. The knob 120 may be configured to be movable along a movement path extending along a side of the display 120 such that the user or driver can move and place the knob 120 at any of a plurality of locations on the movement path. The plurality of locations on the movement path may correspond to the plurality of widget images, respectively, and hence to the plurality of vehicle operation functions, respectively.

The guide rail 130 provides the movement path of the knob 120 and guides the knob 120 to move long the movement path. In this case, the guide rail 130 divides a plurality of locations or functional areas corresponding to the vehicle operation functions included in the image displayed on the display 110, respectively. Here, the display 110 switches and displays each function-specific image for the vehicle operation information whenever the knob 120 is located in the functional area.

Figure 3:
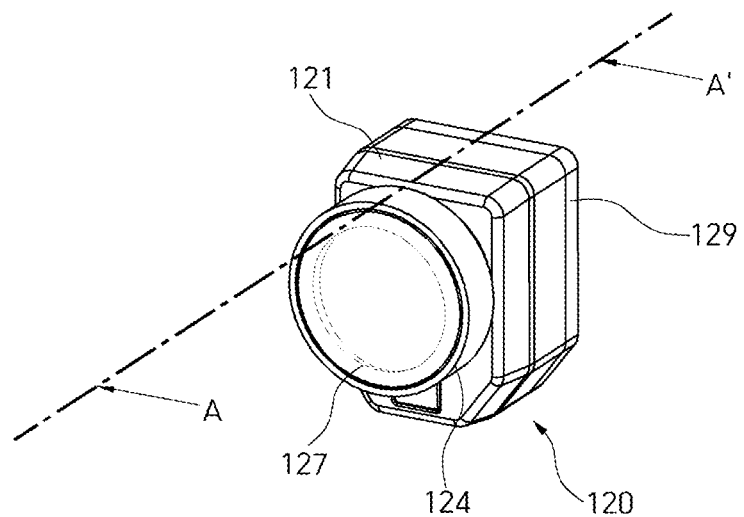
FIG. 3 is a perspective view schematically illustrating a knob in the vehicular display device according to the first embodiment of the present disclosure.
Figure 4:
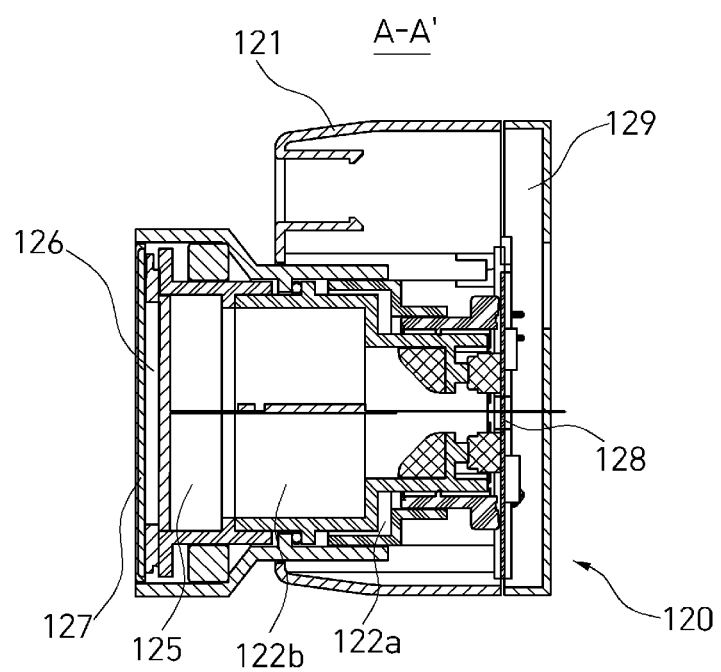
FIG. 4 is a cross-sectional view taken along line A-A' of FIG. 3.
Figure 5:
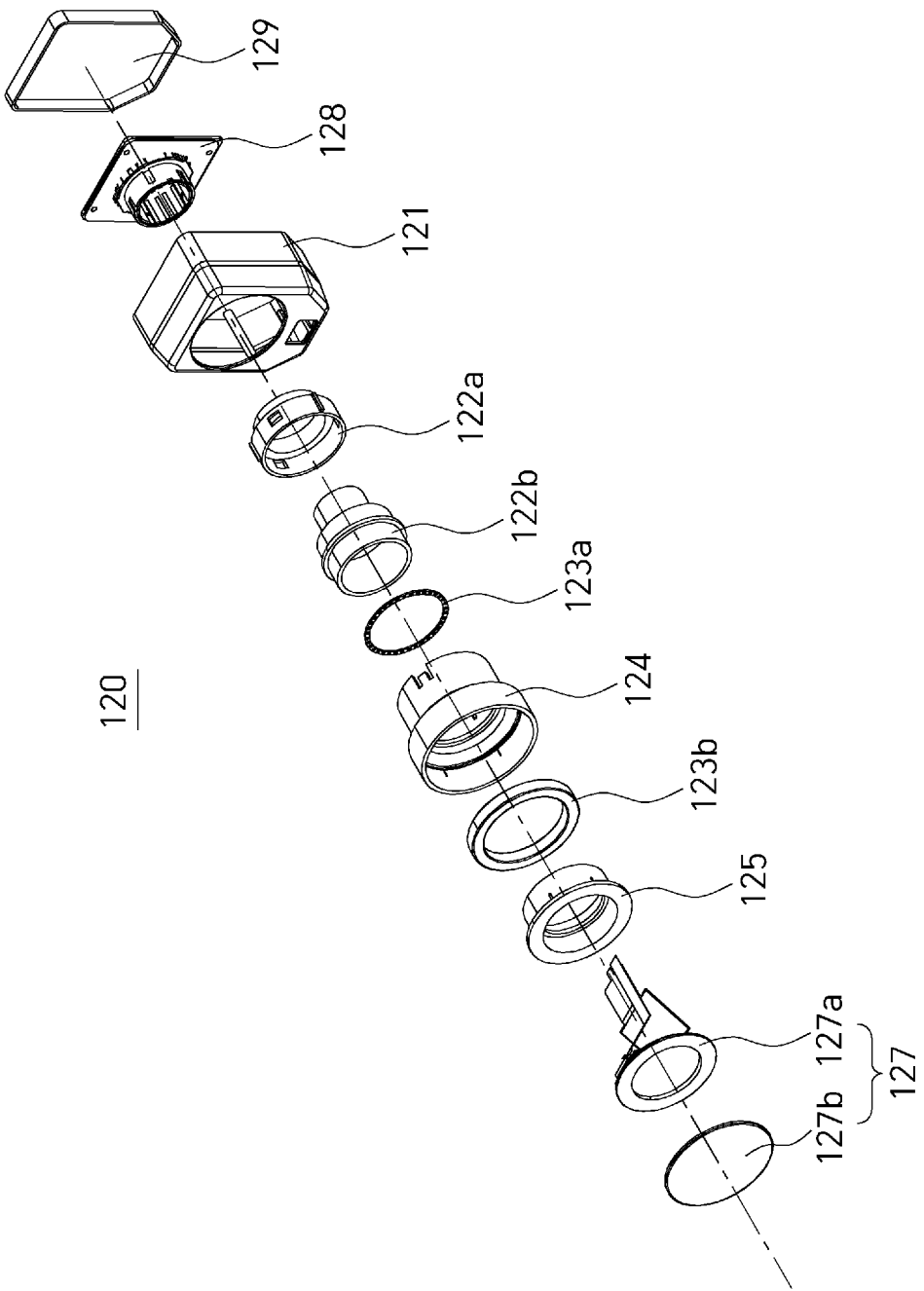
FIG. 5 is an exploded perspective view of the knob of FIG. 3.

FIG. 3 is a perspective view schematically illustrating a knob in the vehicular display device according to the first embodiment of the present disclosure, FIG. 4 is a cross-sectional view taken along line A-A' of FIG. 3, and FIG. 5 is an exploded perspective view of the knob of FIG. 3.

As illustrated in FIGS. 3 to 5, the knob 120 includes an assembly panel 121, an outer holder 122a, an inner holder 122b, a first bearing 123a, a second bearing 123b, a housing 124, a liquid crystal display (LCD) holder 125, an LCD connector 126, an LCD 127, a printed circuit board 128, and a rear cover 129.

The assembly panel 121 forms a basic frame of the knob 120 and includes a sensor cover (not illustrated) therein.

The outer holder 122a may surround an outer part of the inner holder 122b and may be fastened to the inside of the assembly panel 121. Only a partial section of the inner holder 122b in a lengthwise direction is fastened to the assembly panel 121 and the other partial section of the inner holder 122b is exposed to the outside for fastening with surrounding components.

The first bearing 123a and the second bearing 123b are arranged with the housing 124 interposed therebetween. In this case, the housing 124 may be formed in a flange shape having different cross-sectional areas at both ends in a lengthwise direction thereof, and the first bearing 123a and the second bearing 123b have inner and outer diameters at which the first bearing 123a and the second bearing 123b may be arranged at both ends, having different cross-sectional areas, of the housing 124.

The LCD holder 125 has a flange structure having one end protruding outward. A basic body of the LCD holder 125 is in contact with an inner diameter of the second bearing 123b, and a protruding flange part is in contact with a side surface of the second bearing 123b.

The LCD 127 includes an LCD panel unit 127a having a size of 1.3 inches and an LCD glass 127b that protects the LCD panel unit 127a.

The printed circuit board 128 is formed as an encoder type and is electrically connected to the LCD panel unit 127a.

The rear cover 129 surrounds a rear part of the assembly panel 121 with the printed circuit board 128 interposed therebetween. In this case, the rear cover 129 may have a structure that may be snap-fit fastened to the rear part of the assembly panel 121.

Figure 6:
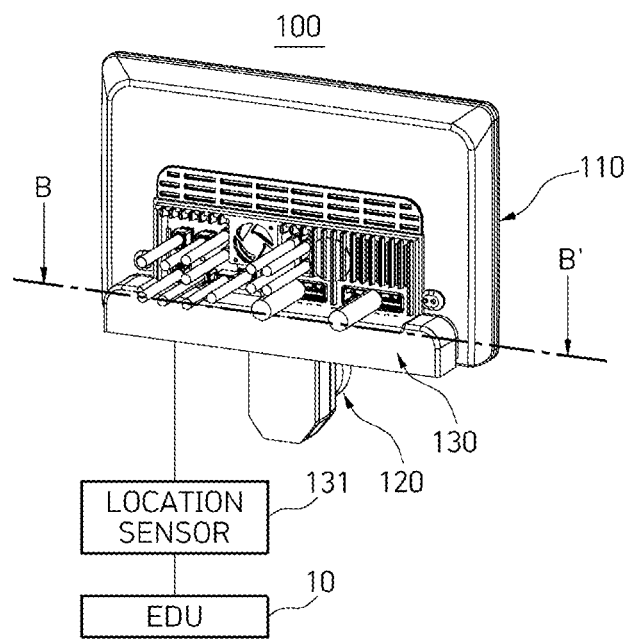
FIG. 6 is a schematic rear view illustrating the vehicular display device according to the first embodiment of the present disclosure.

FIG. 6 is a schematic rear view illustrating the vehicular display device according to the first embodiment of the present disclosure.

Referring to FIG. 6, the guide rail 130 for providing a movement path of the knob 120 includes a plurality of location sensors 131 arranged at regular intervals in a lengthwise direction. Here, the location sensors 131 detect a location of the knob 120 when the knob 120 moves leftward or rightward in a lengthwise direction of the guide rail 130 and transmit the detected data to an electronic control unit (ECU) 10.

The ECU 10 may compare reference data with the detected data of the knob 120 received from the location sensors 131 and control, on the basis of the compared value, the display 110 to display the widget of the corresponding function as an image.

Figure 7:
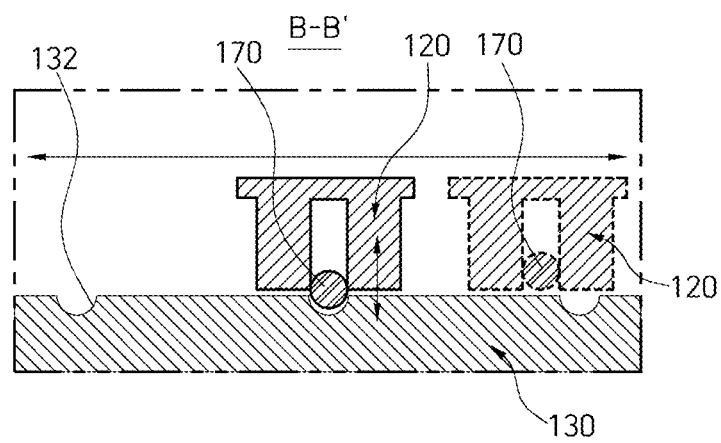
FIG. 7 is an operation exemplary view schematically illustrating a cross-section taken along line B-B' of FIG. 6.
Figure 8:
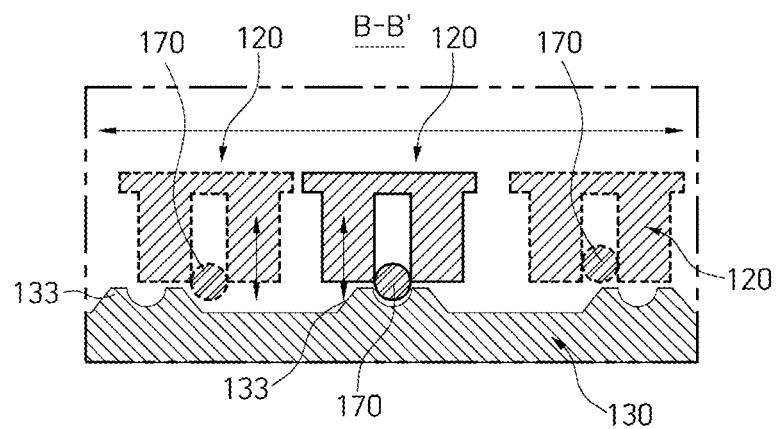
FIG. 8 is an operation modification exemplary view schematically illustrating the cross-section taken along line B-B' of FIG. 6.

FIG. 7 is an operation exemplary view schematically illustrating a cross-section taken along line B-B' of FIG. 6, and FIG. 8 is an operation modification exemplary view schematically illustrating the cross-section taken along line B-B' of FIG. 6.

First, as illustrated in FIG. 7, when the knob 120 moves in the lengthwise direction of the guide rail 130, since the corresponding function may be smoothly performed only when the knob 120 is stopped at a location of each function-specific widget of the display 110, the guide rail 130 may include grooves 132, which may be locking grooves.

Here, the locking grooves 132 are located at regular intervals in the lengthwise direction of the guide rail 130 and are recessed in functional areas (areas in which function-specific widgets of the display 110 are located) in which the locking grooves 132 are located. To this end, the locking grooves 132 divide location areas of the knob 120, which are interlocked with functions of the display 110.

The knob 120 may include a ball plunger 170 using a ball spring manner, which is fitted in the locking groove 132 to enable a stopping operation for each locking groove 132. In this case, the ball plunger 170 is located at an upper end of the knob 120.

Here, the ball plunger 170 has a structure that may be expanded or contracted in a lengthwise direction of a body thereof. Thus, the ball plunger 170 does not interfere with the sliding movement of the knob 120 when the knob 120 is located in a section in which there is no locking groove 132. When the ball plunger 170 reaches the locking groove 132, an end thereof is fitted in the locking groove 132 through an expansion/contraction operation.

Next, referring to FIG. 8, the guide rail 130 may also include locking steps 133. Here, the locking steps 133 have a structure in which the locking steps 133 protrude at regular intervals in the lengthwise direction of the guide rail 130 and by which the ball plunger 170 is caught when the knob 120 moves in the lengthwise direction of the guide rail 130.

Figure 9:
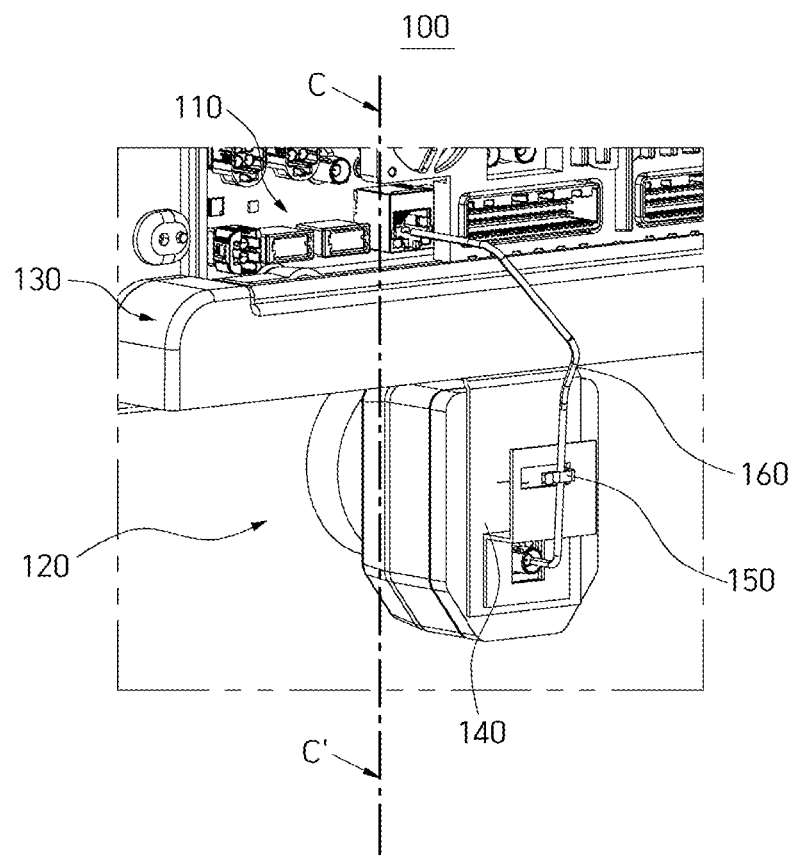
FIG. 9 is a rear view illustrating a part of the vehicular display device according to the first embodiment of the present disclosure.
Figure 10:
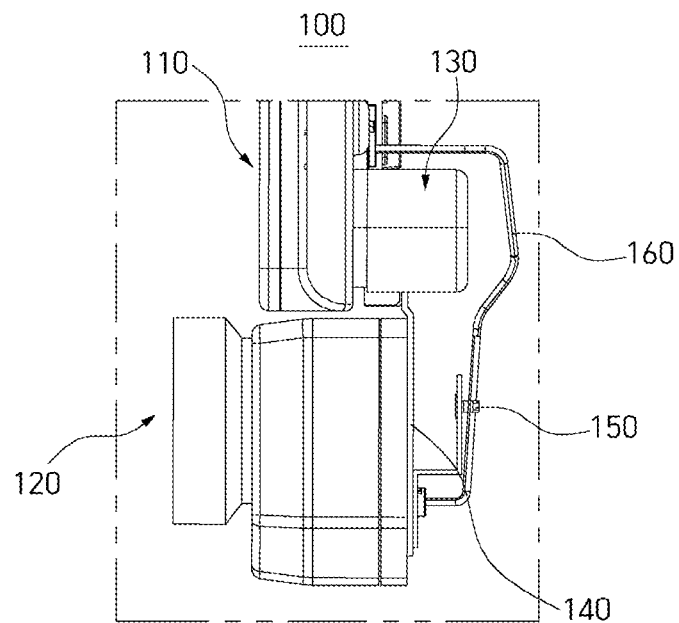
FIG. 10 is a side view illustrating the part of the vehicular display device according to the first embodiment of the present disclosure.
Figure 11:
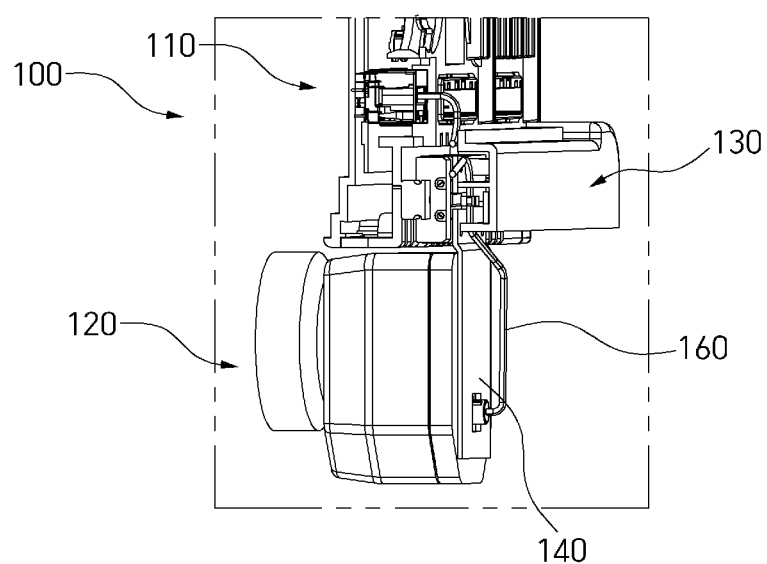
FIG. 11 is a cross-sectional view taken along line C-C' of FIG. 9.

FIG. 9 is a rear view illustrating a part of the vehicular display device according to the first embodiment of the present disclosure, FIG. 10 is a side view illustrating the part of the vehicular display device according to the first embodiment of the present disclosure, and FIG. 11 is a cross-sectional view taken along line C-C' of FIG. 9.

Referring to FIGS. 9 to 11, a wire 160 may be provided between the display 110 and the knob 120 to electrically connect the display 110 and the knob 120.

Here, the wire 160 has a structure that is bent around the guide rail 130 to prevent the knob 120 from interfering with the guide rail 130 when the knob 120 moves in the lengthwise direction of the guide rail 130. This bending structure is made to secure a flow space of the wire 160.

Here, the wire 160 may be bent by itself or may be built in a wire cover that has a bent shape, surrounds the wire 160, and is made of a hard material.

The knob 120 may be connected to the guide rail 130 through a connecting bracket 140. The connecting bracket 140 may be made of metal having excellent durability (for example, aluminum, steel, magnesium, or the like).

The knob 120 may include a fixing bracket 150 through which the wire 160 is attached or detached. Here, the fixing bracket 150 may be fastened to the connecting bracket 140 and may be detached from the connecting bracket 140.

Change Structure of UI of Display (Function-Specific Example According to Knob Operation)

Figure 12:
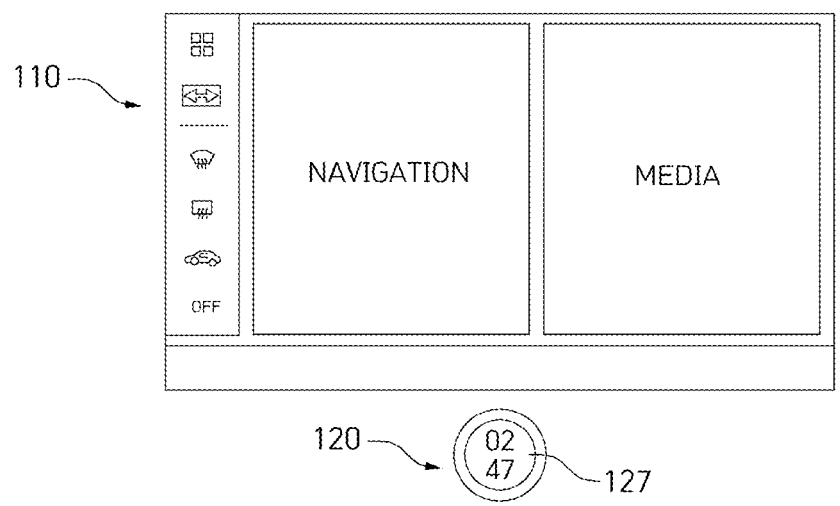
FIGS. 12 and 13 are schematic views illustrating a change structure of a user interface (UI) according to a knob operation intention in the vehicular display device according to the first embodiment of the present disclosure.
Figure 13:
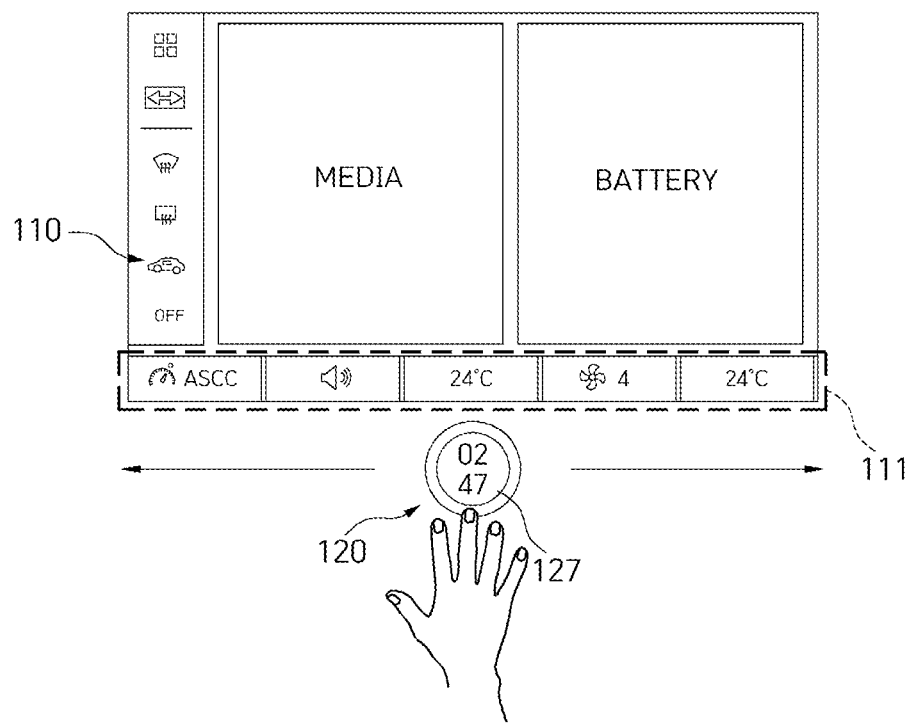

FIGS. 12 and 13 are schematic views illustrating a change structure of UI according to a knob operation intention in the vehicular display device according to the first embodiment of the present disclosure.

Referring to FIGS. 12 and 13, when a user or driver operates the knob 120, the display 110 displays, as a UI, a function related to the vehicle operation information.

In this case, in a function widget 111 displayed at a lower end of the display 110, five functions are partitioned according to locations. When the knob 120 moves to a location corresponding to each function partitioned in the function widget 111, as the function widget 111 interlocked with the knob 120 is activated, an image for the corresponding function is displayed on the display 110.

Figure 14:
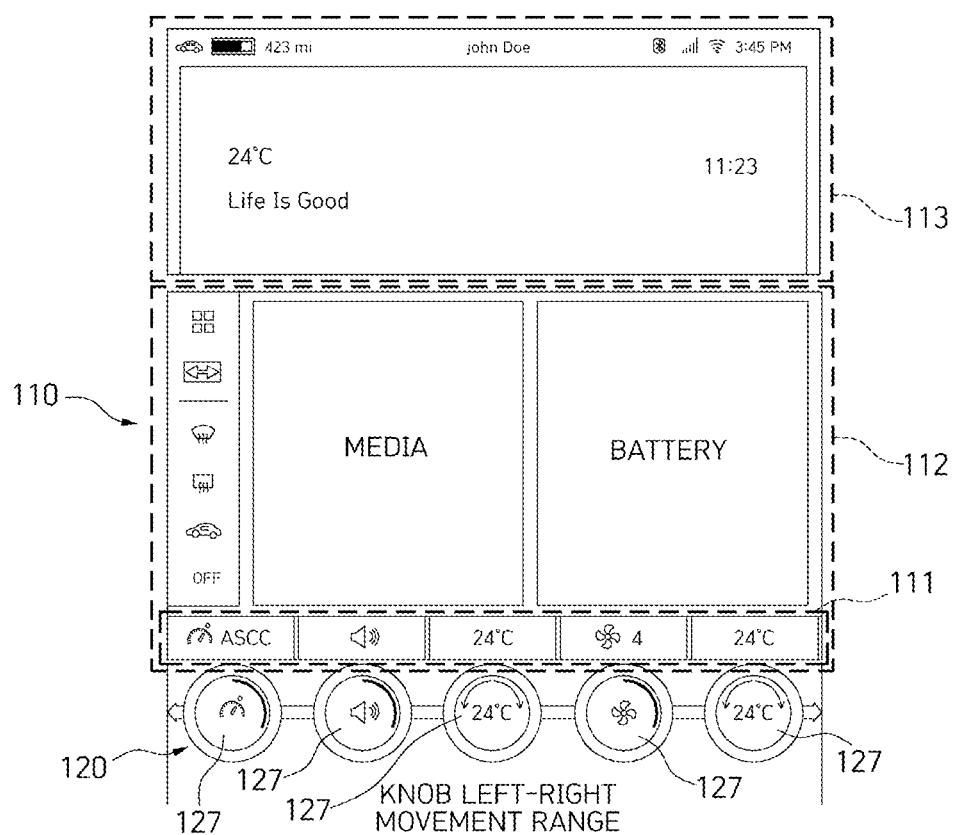
FIG. 14 is an exemplary view illustrating a state in which each function is displayed on a display by operating the knob in the vehicular display device according to the first embodiment of the present disclosure.

FIG. 14 is an exemplary view illustrating a state in which each function is displayed on a display by operating the knob in the vehicular display device according to the first embodiment of the present disclosure.

Referring to FIG. 14, in the display 110, the function widget 111, a lower display 112, and an upper display 113 basically display images for areas.

The function widget 111 may display, as widget icons, a plurality of functions related to the vehicle operation information, and the lower display 112 and the upper display 113 may display, as images, detailed contents related to the function widget 111.

As illustrated in FIG. 14, in the function widget 111, five functions are partitioned and displayed according to locations. This is merely one example, but the present disclosure is not limited thereto, and a plurality of N function widgets 111 may be displayed.

Figure 15:
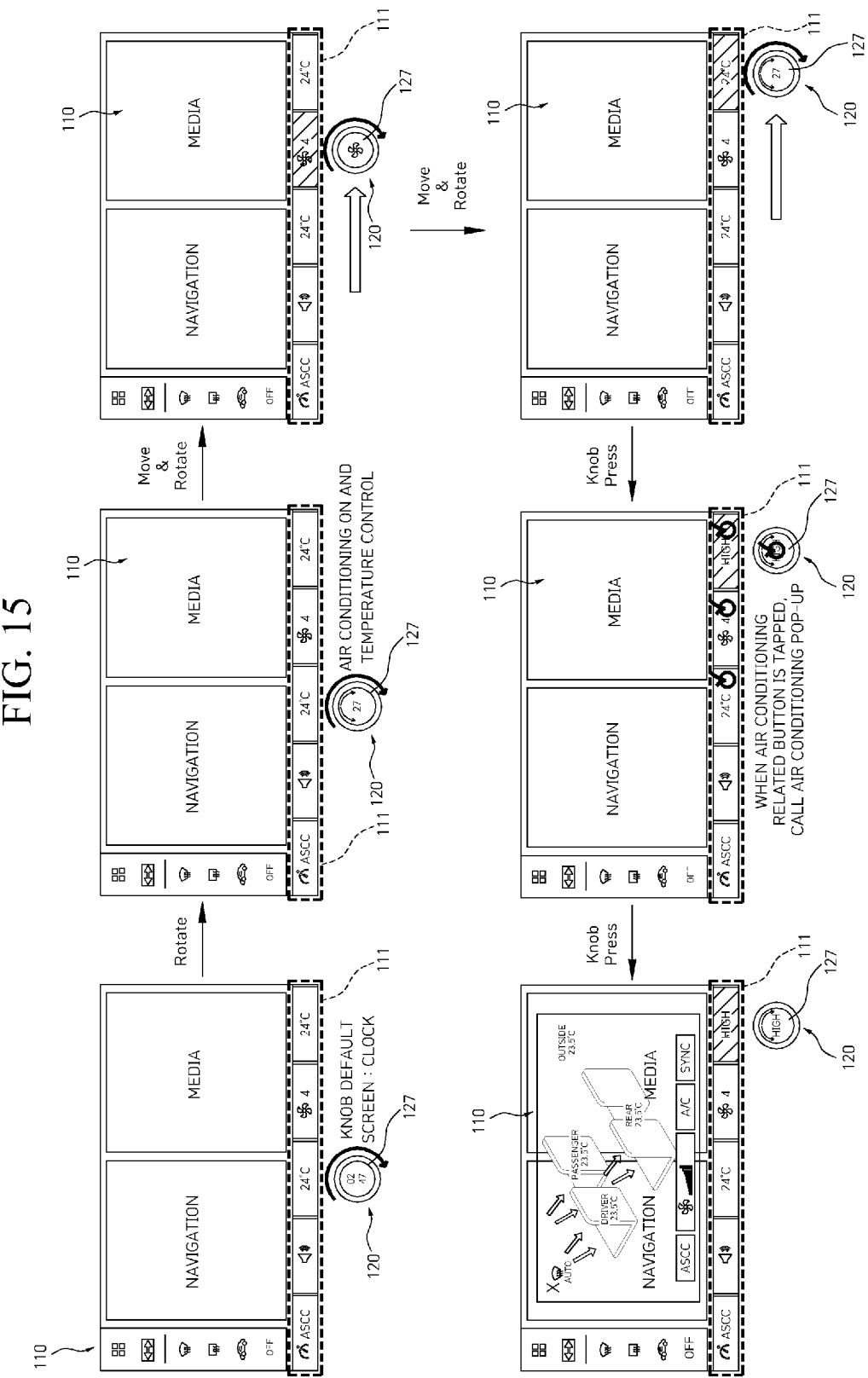
FIG. 15 is an exemplary view illustrating a state in which a vehicular indoor temperature is adjusted by operating the knob in the vehicular display device according to the first embodiment of the present disclosure.

FIG. 15 is an exemplary view illustrating a state in which a vehicular indoor temperature is adjusted by operating the knob in the vehicular display device according to the first embodiment of the present disclosure.

Referring to FIG. 15, the knob 120 moves to a function-specific location partitioned in the function widget 111 of the display 110 and serves as an arrow key so that the user may perform a desired function.

In this case, the LCD 127 of the knob 120 displays an image of the function widget 111 interlocked with a current location of the knob 120. The function-specific widget displayed in the function widget 111 may be selected according to the left-right movement of the knob 120, and detailed function execution for each function may be adjusted by rotating the knob 120.

Here, the LCD 127 of the knob 120 basically displays a watch screen. The LCD 127 may display images for various functions through location movement, rotation, pushing, and the like of the knob 120.

Figure 16:
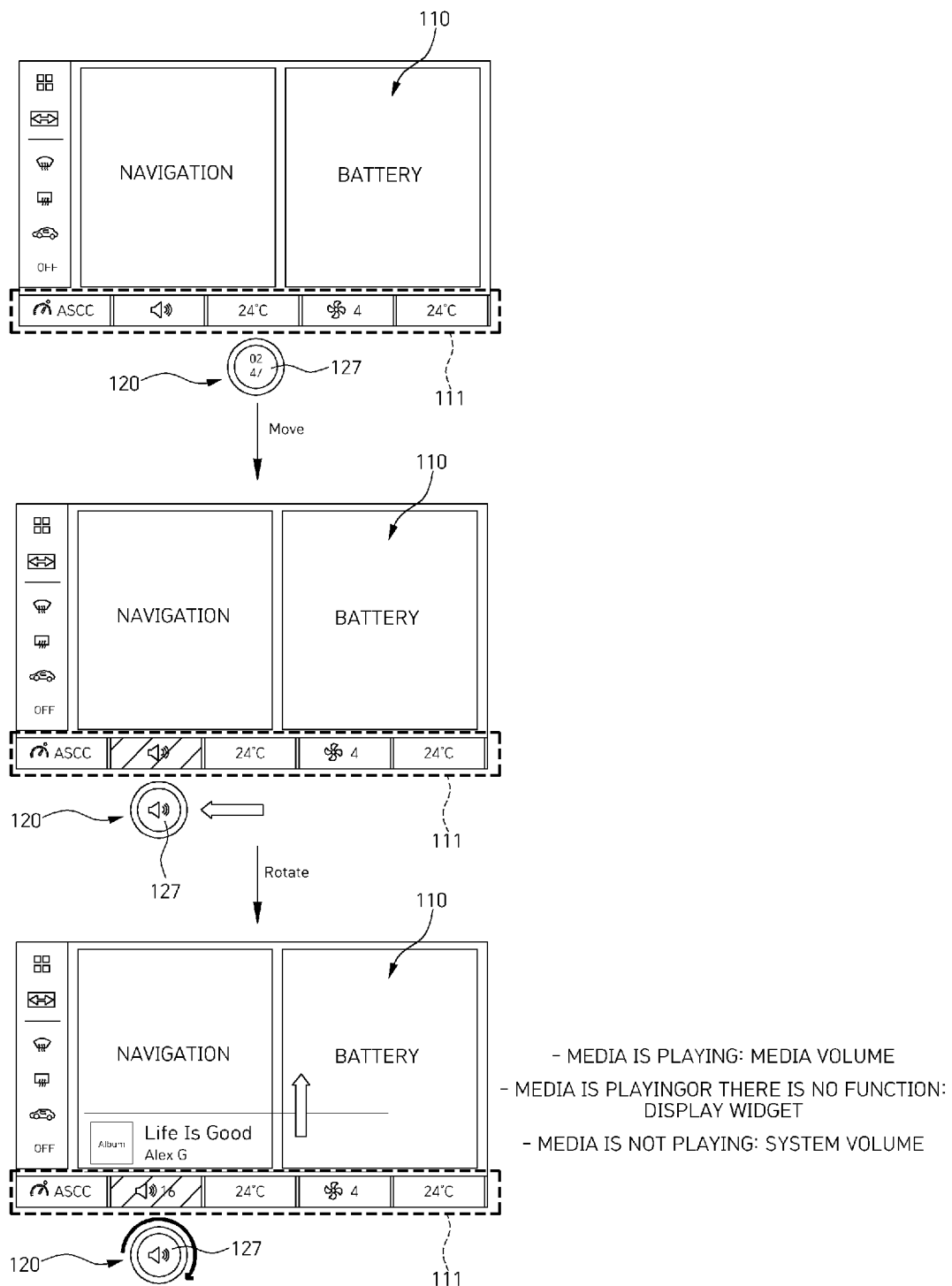
FIG. 16 is an exemplary view illustrating a state in which the volume of a vehicular indoor sound source is adjusted by operating the knob in the vehicular display device according to the first embodiment of the present disclosure.

FIG. 16 is an exemplary view illustrating a state in which the volume of a vehicular indoor sound source is adjusted by operating the knob in the vehicular display device according to the first embodiment of the present disclosure;

Referring to FIG. 16, the user moves the knob 120 leftward to adjust the volume of the vehicular indoor sound source. In this case, when a corresponding function image is displayed in the LCD 127, the user may specifically operate the corresponding function by rotating the knob 120.

Figure 17:
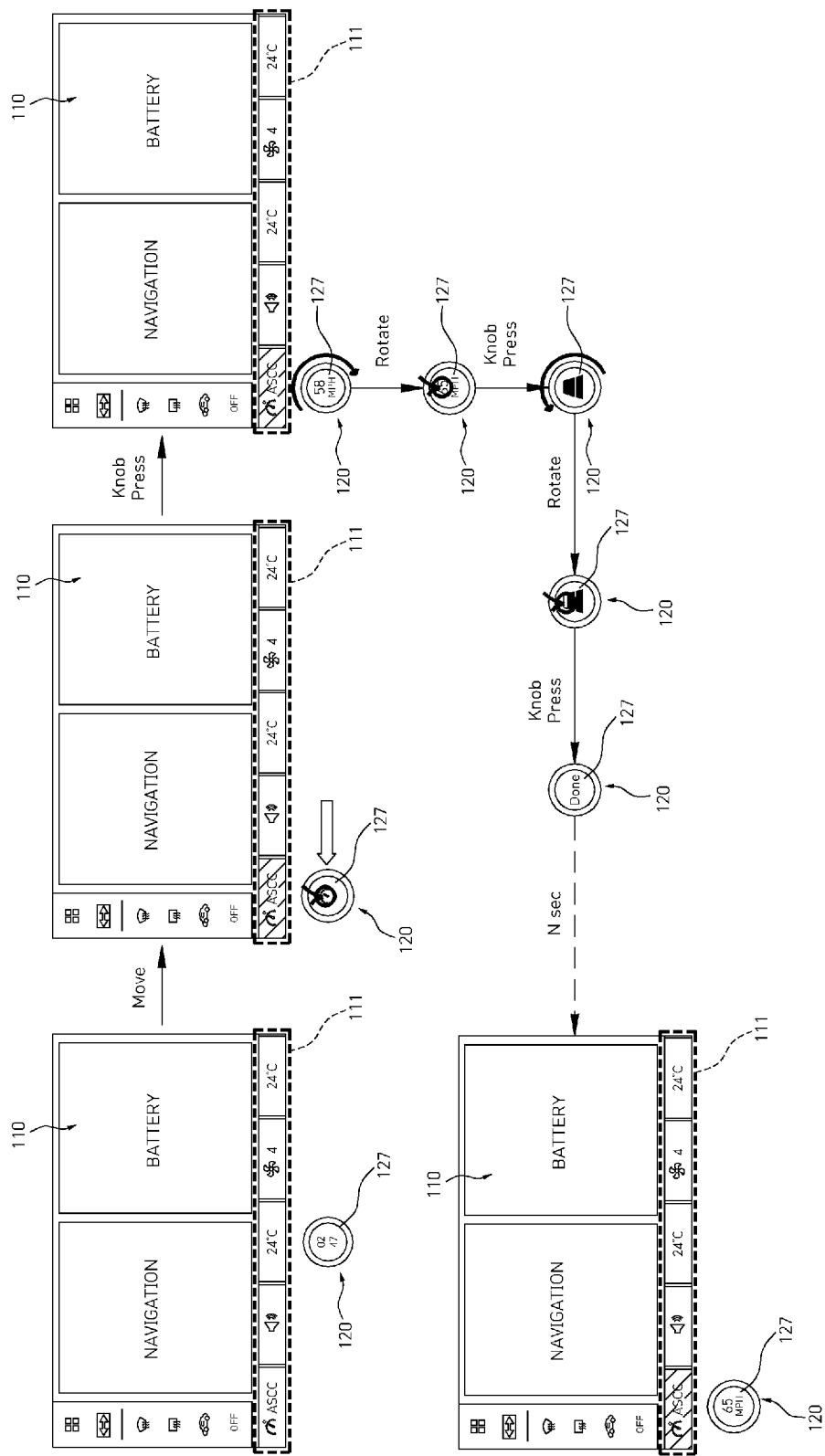
FIG. 17 is an exemplary view illustrating a state in which an advanced smart cruise control (ASCC) function is performed by operating the knob in the vehicular display device according to the first embodiment of the present disclosure.

FIG. 17 is an exemplary view illustrating a state in which an advanced smart cruise control (ASCC) function is performed by operating the knob in the vehicular display device according to the first embodiment of the present disclosure.

Referring to FIG. 17, when the knob 120 is moved leftward, an ASCC mode may be performed. Here, the LCD 127 of the knob 120 displays an image for the ASCC mode, and when the user rotates the knob 120 or pushes a button of the LCD 127, the image of the LCD 127 is displayed in accordance with the corresponding function.

In this case, the corresponding function is displayed on the display 110 according to the operation of the knob 120, and an integrated controller interlocked with the knob 120 performs the corresponding function.

Figure 18:
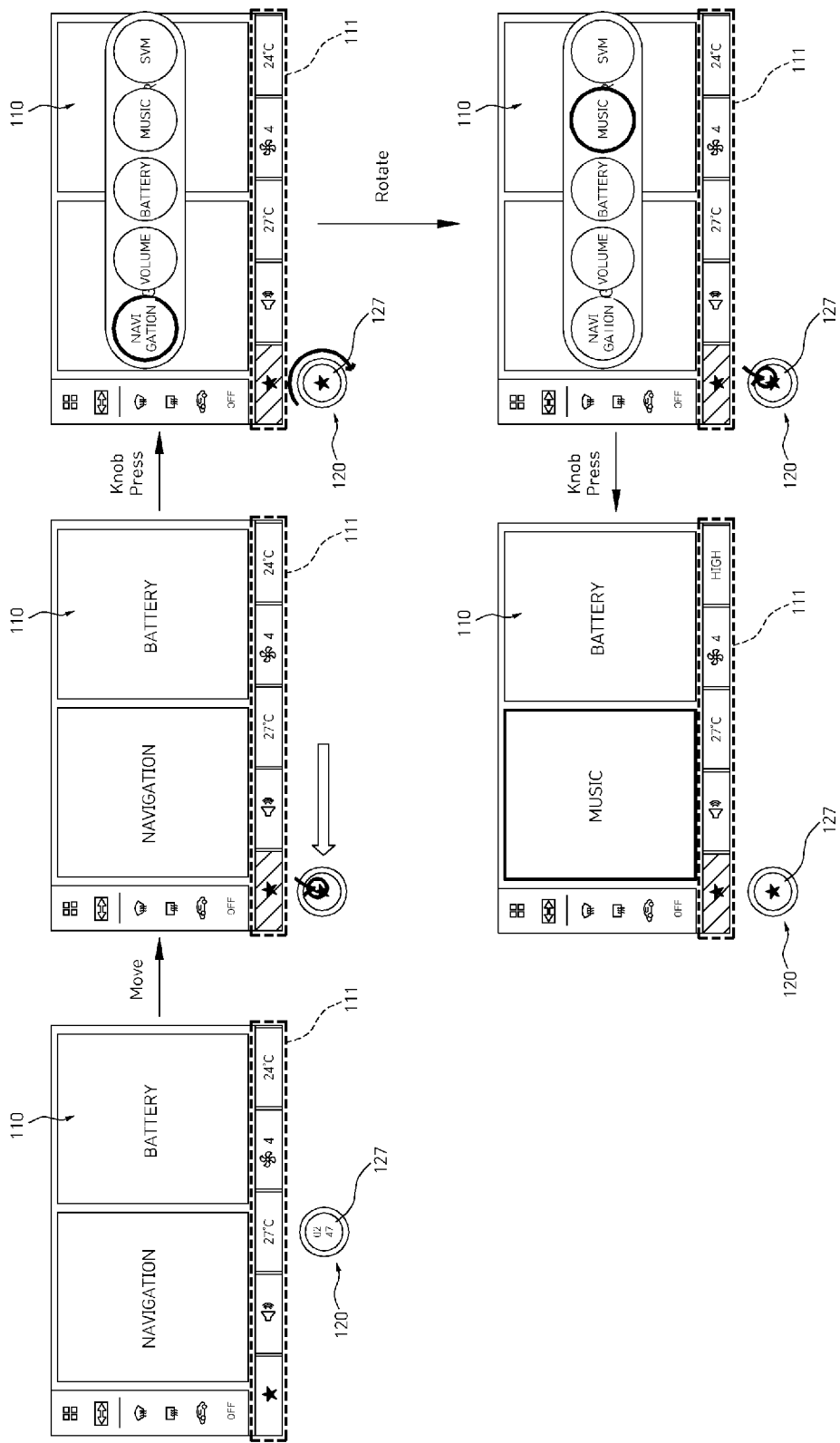
FIG. 18 is an exemplary view illustrating a state in which a user-specified function is performed by operating the knob in the vehicular display device according to the first embodiment of the present disclosure.

FIG. 18 is an exemplary view illustrating a state in which a user-specified function is performed by operating the knob in the vehicular display device according to the first embodiment of the present disclosure.

Referring to FIG. 18, a shortcut key provided to quickly access a menu designated by the user may be disposed in a specific area of the function widget 111. Setting of the shortcut key may be implemented as desired by the user, and as illustrated, the shortcut key may be set to a navigation mode, a volume mode, a battery mode, a music mode, and a surround view monitor (SVM) mode.

In this case, when the knob 120 is rotated or pushed in a state in which the knob 120 is moved to the corresponding shortcut key, the desired mode is performed. Here, the screen layout of the display 110 or widget setting for each function may be conveniently operated by the user in a setting mode.

The change structure of the UI of display 110 as seen through FIGS. 12 to 18 is not limited to the first embodiment, and may be applied to all embodiments described in the present specification.

Second Embodiment

Figure 19:
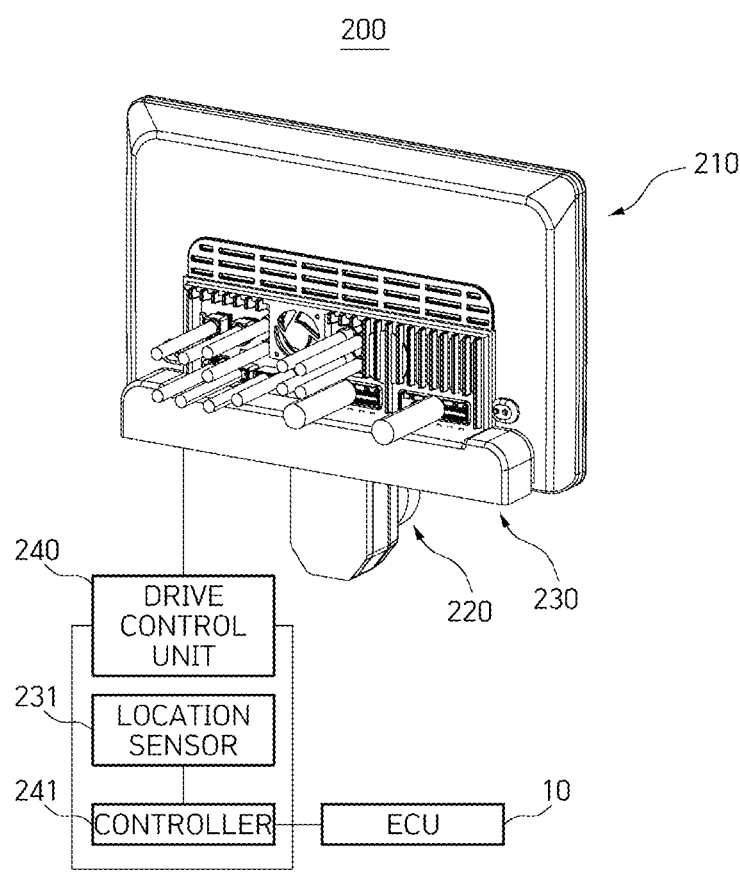
FIG. 19 is a schematic rear view illustrating a vehicular display device according to a second embodiment of the present disclosure.

FIG. 19 is a schematic rear view illustrating a vehicular display device according to a second embodiment of the present disclosure.

Referring to FIG. 19, a vehicular display device 200 includes a display 210, a knob 220, and a drive control unit 240.

A display 210 and a knob 220 may be operatively coupled to and/or electrically interlocked with each other, and thus the user may selectively operate the corresponding function of the display 210 through left-right movement, rotation, and pushing of the knob 220.

The drive control unit 240 controls the display 210 to display the corresponding function according to the location movement of the knob 220.

The drive control unit 240 includes a guide rail 230, a location sensor 231, and a controller 241.

The guide rail 230 may provide a left-right movement path of the knob 22 and have components embedded therein and related to electronic units. Accordingly, the guide rail 230 may be covered with a separate cover forming an external shape.

The location sensors 231, which are photo sensors, are arranged in the guide rail 230 at regular intervals to detect the location of the knob 220.

The controller 241 may compare a preset data value with a value of the location of the knob 220 detected by the location sensor 231, and control, according to a result value of the comparison, the display 210 to display the corresponding function. In this case, the controller 241 may perform the function of the ECU 10 itself or may be connected to the ECU 10.

Third Embodiment

Figure 20:
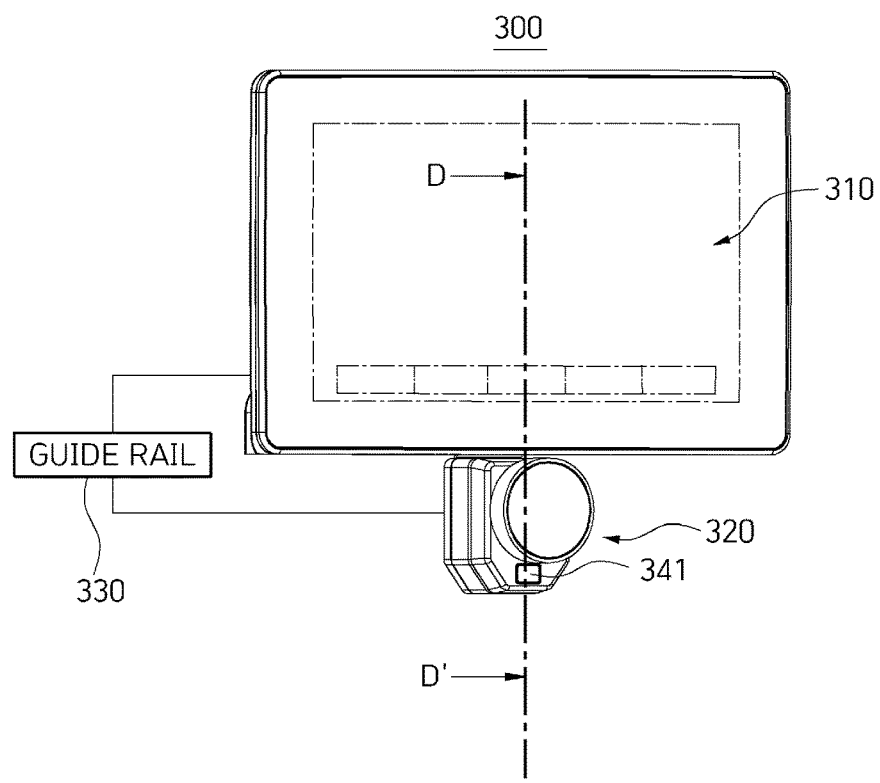
FIG. 20 is a schematic view illustrating a vehicular display device according to a third embodiment of the present disclosure.
Figure 21:
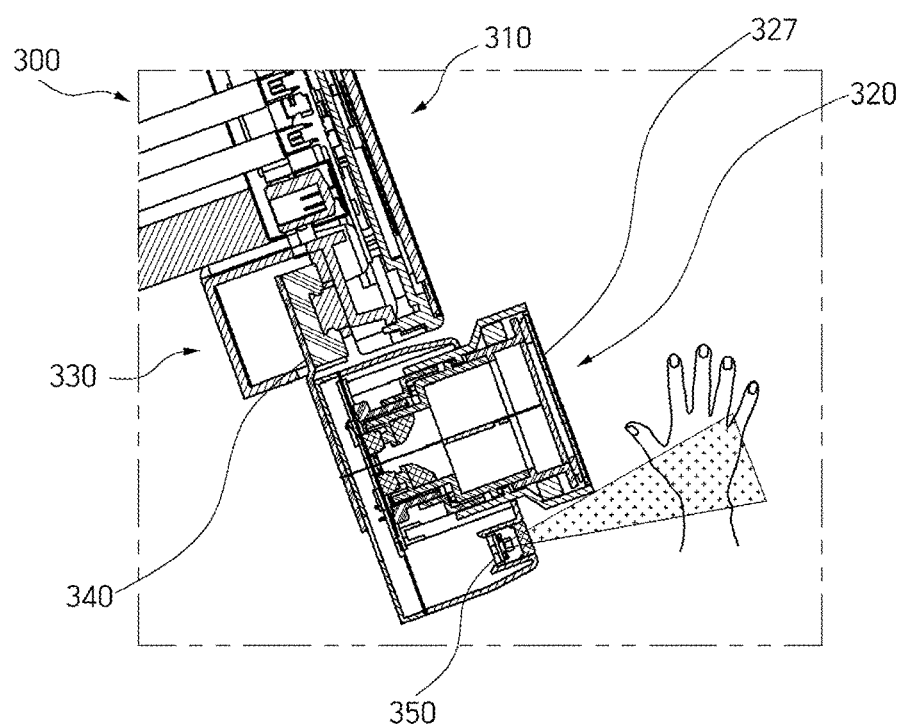
FIG. 21 is an operation exemplary view illustrating a cross-section taken along line D-D' of FIG. 20.

FIG. 20 is a schematic view illustrating a vehicular display device according to a third embodiment of the present disclosure, and FIG. 21 is an operation exemplary view illustrating a cross-section taken along line D-D' of FIG. 20.

Referring to FIGS. 20 and 21, a display 310 and an LCD 327 of a knob 320 is basically made as a capacitive type, and thus touch sensitivity is improved.

When the user allows a conductor (including a body and an object through which a current flows) to approach a preset proximity distance to grip the knob 320, the LCD 327 or the display 310 recognizes this state and interlocks a system.

In this case, an infrared ray (IR) sensor or a time-of-flight (ToF) sensor 350 is provided at a lower end of the knob 320 to recognize a motion of the user.

Of course, the IR sensor or the ToF sensor 350 is not limited to the lower end of the knob 320 and may be mounted at any location as long as the location is not obstructed by the front view angle.

Meanwhile, a grip part of a rim of the knob 320 may recognize a touch by connecting an inner electrostatic touch sensor by applying a conductive material. In this case, a flexible printed circuit board (FPCB) type touch film may be applied to an inner periphery of the rim of the knob 320.

Fourth Embodiment

Figure 22:
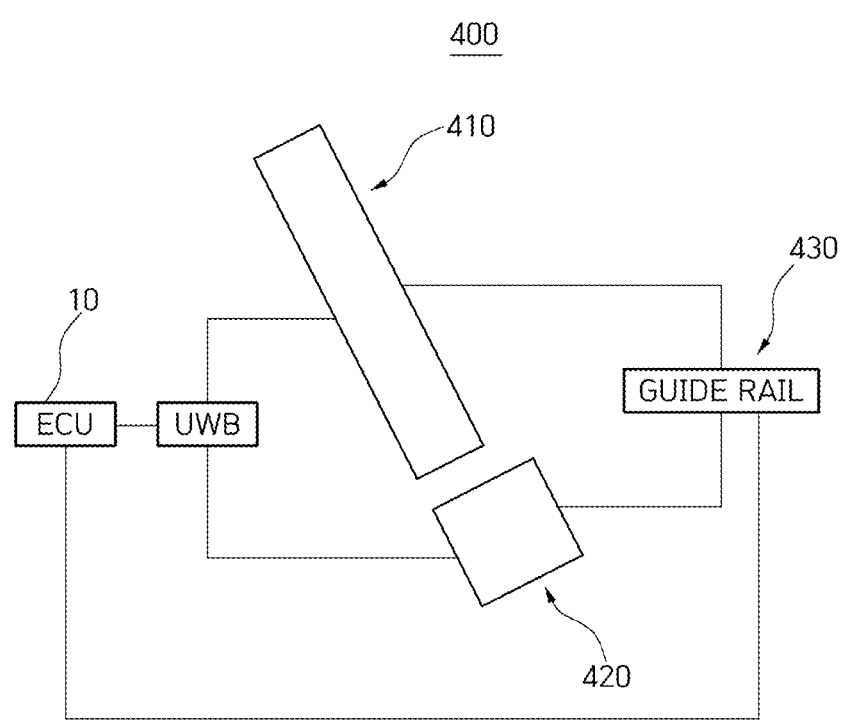
FIG. 22 is a block diagram schematically illustrating a vehicular display device according to a fourth embodiment of the present disclosure.

FIG. 22 is a block diagram schematically illustrating a vehicular display device according to a fourth embodiment of the present disclosure.

Referring to FIG. 22, a knob 420 may be wirelessly connected to a display 410 via an ultra-wide band (UWB) connection.

The UWB is a technology which calculates a distance between subjects by multiplying a signal arrival time between communication subjects by the speed of light using a ToF technology.

Unlike Wi-Fi and Bluetooth, the UWB uses a wide frequency band and may transmit a large amount of information with a high transmission speed using low power.

Positioning using the UWB technology has the advantage in that an error rate is as low as about 20 centimeters, transmittance to an obstacle is high, and the positioning is not affected by other signals such as Wi-Fi.

Accordingly, in a state in which the display 410 and the knob 420 are wirelessly connected in the UWB manner, integrated control can be performed by the ECU 10.

For example, when the knob 420 moves along a guide rail 430, the display 410 interlocked with the knob 420 displays a function-specific widget interlocked with the location of the knob 420.

When the user sets the displayed widget, the corresponding function may be performed according to a command of the ECU 10.

According to the present disclosure, in a vehicular display device, a sliding knob and a display are integrated, and thus the degree of freedom of a slimmed cockpit space can be secured, and intuitive operation convenience can be realized.

In particular, as one knob is moved in a left-right direction, a display menu can be efficiently selected through a corresponding interlocking operation, and as operation steps are reduced, intuitiveness and operability can be improved.

The present disclosure is not limited to the above-described embodiments and can be variously modified and implemented without departing from the allowable scope of the technical spirit of the present disclosure.

What is claimed is:

1. A display device for a vehicle, comprising:
a display configured to display images related to a plurality of functions of the vehicle;
a knob operatively coupled to the display and configured to be movable along a movement path extending along a side of the display such that a driver can move and place the knob at any of a plurality of locations on the movement path, the plurality of locations respectively corresponding to the plurality of functions of the vehicle;
a guide rail configured to guide the knob to move along the movement path; and
a wire extending between the knob and the display and bent around the guide rail to avoid impeding a movement of the knob along the guide rail,
wherein the knob comprises a fixing bracket configured to hold the wire.

2. The display device of claim 1, wherein:
the plurality of functions of the vehicle includes a first function,
the plurality of locations on the movement path includes a first location corresponding to the first function, and
the display is configured to display a first image related to the first function when the knob is moved and placed at the first location on the movement path.

3. The display device of claim 1, wherein the guide rail comprises a location sensor configured to detect a location on the movement path at which the knob is placed.

4. The display device of claim 1, wherein the guide rail comprises a plurality grooves at locations corresponding respectively to the plurality of locations on the movement path.

5. The display device of claim 4, wherein the knob comprises a ball plunger configured to fit into the grooves.

6. The display device of claim 1, wherein the knob is wirelessly connected to the display via an ultra-wide band (UWB) connection.

7. A display device for a vehicle, comprising:
a display configured to display images related to a plurality of functions of the vehicle;
a knob operatively coupled to the display and configured to be movable along a movement path extending along a side of the display such that a driver can move and place the knob at any of a plurality of locations on the movement path, the plurality of locations respectively corresponding to the plurality of functions of the vehicle;
a drive control unit configured to control the display to display the image related to the function of the vehicle corresponding to the location of the knob on the movement path;
a guide rail configured to guide a movement of the knob along the movement path; and
a wire extending between the knob and the display and bent around the guide rail to avoid impeding a movement of the knob along the guide rail,
wherein the knob comprises a fixing bracket configured to hold the wire.

8. The display device of claim 7, wherein the drive control unit includes:
a location sensor configured to detect the location on the movement path at which the knob is placed; and
a controller configured to control the display to display the corresponding function based on the detected location of the knob on the movement path.

9. A display device for a vehicle, comprising:
a display configured to display images related to a plurality of functions of the vehicle;
a knob operatively coupled to the display and configured to be movable along a movement path extending along a side of the display such that a driver can move and place the knob at any of a plurality of locations on the movement path, the plurality of locations respectively corresponding to the plurality of functions;
a guide rail provided between the display and the knob and configured to guide the knob to move along the movement path; and
a wire extending between the knob and the display and bent around the guide rail to avoid impeding a movement of the knob along the guide rail,
wherein the knob comprises a fixing bracket configured to hold the wire, and
wherein, when the knob is moved to be within a predetermined distance from a first location of the plurality of locations on the movement path, the knob is configured to cause the display to display a first image related to the function corresponding to the first location on the movement path.

10. The display device of claim 9, wherein the knob includes a connecting bracket connected to the guide rail.

11. The display device of claim 9, wherein the knob includes:

a liquid crystal display (LCD) configured to, when the knob is moved to a second location of the plurality of locations on the movement path, display a second image related to the second function corresponding to the second location on the movement path; and
a sensor configured to detect a movement of the driver.

\* \* \* \* \*